March 10, 1942.  O. M. NACKER ET AL  2,275,796

DIRECTION SIGNAL SWITCH

Filed March 5, 1941   2 Sheets-Sheet 1

Inventors
Owen M. Nacker &
Andrew L. Vargha

Blackmore, Spencer & Flint
Attorneys

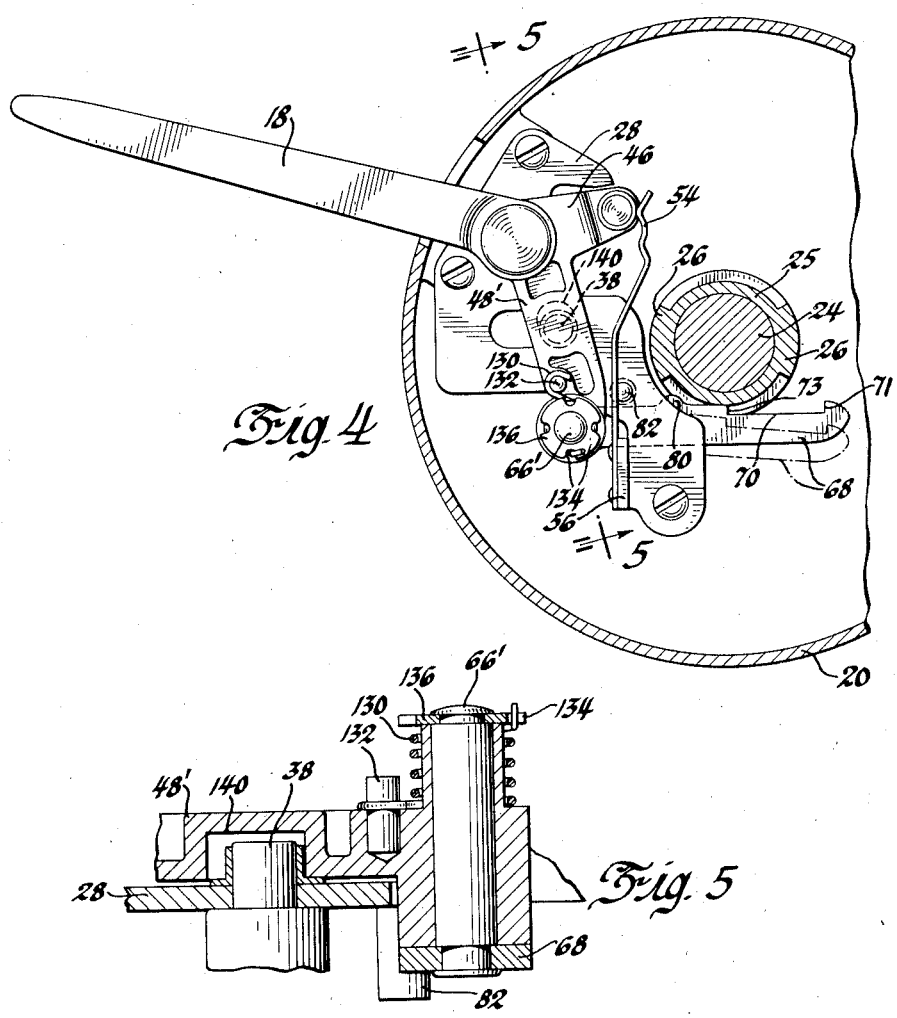
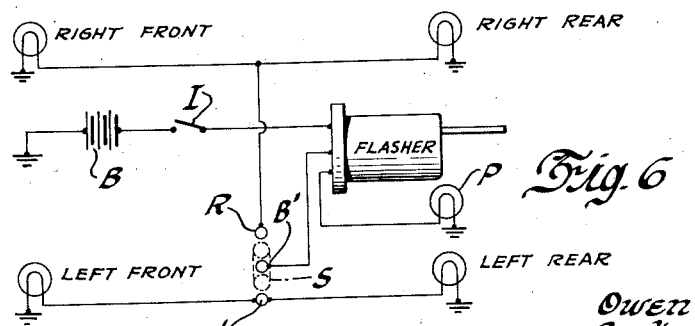

Patented Mar. 10, 1942

2,275,796

UNITED STATES PATENT OFFICE 2,275,796

DIRECTION SIGNAL SWITCH

Owen M. Nacker, Pleasant Ridge, and Andrew L. Vargha, Detroit, Mich., assignors to General Motors Corporation, Detroit, Mich., a corporation of Delaware Application March 5, 1941, Serial No. 381,880

5 Claims. (Cl. 200—59)

This invention has to do with the direction signal switch for automobiles of the type that is set manually to give the desired signal and is automatically returned to off position when the wheels of the automobile are turned toward straight ahead position. The switch is characterized by simplicity and economy of construction combined with reliability in service.

The invention is disclosed in the accompanying drawings and specification and the novel features are indicated in the appended claims.

In the drawings:

Figure 4 is a top plan view with parts in section similar to Figure 2 but showing a slight modification.

Figure 5 is a fragmentary sectional view taken on line 5—5 of Figure 4.

Figure 6 is a diagrammatic view showing the circuit employed.

Figure 1:
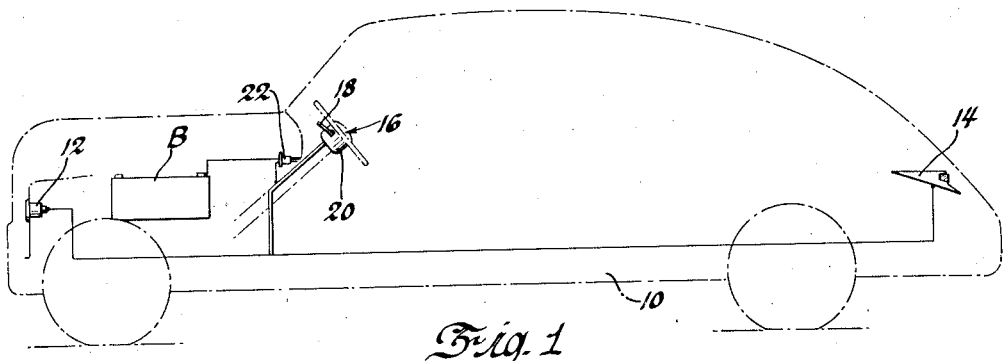
Figure 1 is a diagrammatic view showing the switch and direction signals as applied to an automobile.

There is indicated at 10 in Figure 1 the outline of an automobile equipped with battery B, front direction signals 12 and rear direction signals 14 operated by a switch which may be closed by moving handle 18 projecting from the enlarged upper end 20 of the steering shaft housing containing the switch and switch operating mechanism. Current is supplied from the battery to the switch through flasher 22 which may be mounted on the dash or on the steering column.

The circuit employed may be varied as desired. In Figure 6 there is shown diagrammatically a well known circuit corresponding to that indicated in Figure 1. Here current from battery B is supplied through ignition switch I to a suitable flasher which when actuated by closing the direction signal switch supplies interrupted current to pilot light P and battery contact B' of the direction signal switch. Conducting segment S of the switch which is shown in full lines in Figure 3 and in dotted lines in Figure 6 may be moved to connect battery contact B' with right direction signal contact R or left direction signal contact L to supply interrupted current to the right or left direction signals, respectively. The front and rear direction signals may consist of separate lamps mounted in the fenders or on the sides of the body or, if desired, both the right and left signals may be combined in a central unit at front and rear of the car. If desired the direction signals may be combined with parking lights, stop lights or tail lights now customarily provided and in such case the direction signal may consist either of additional filaments provided in the bulbs used for such conventional lights or of separate bulbs in the same housing as the conventional lights.

Figure 2:
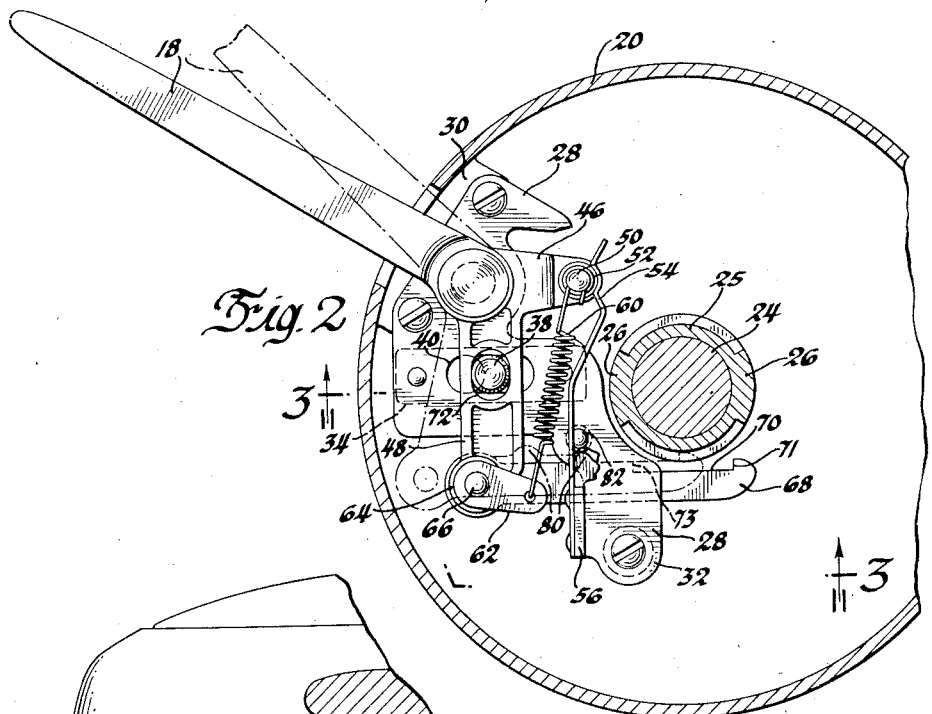
Figure 2 is a top plan view of the direction signal operating mechanism with parts in section showing the switch as mounted on the steering column.
Figure 3:
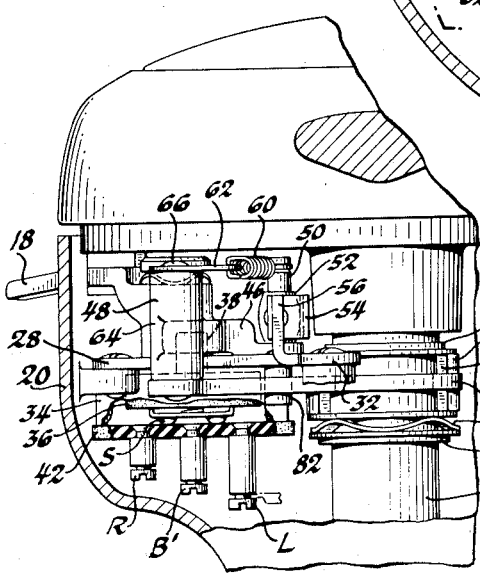
Figure 3 is a view partly in section taken approximately on line 3—3 of Figure 2.

Referring now to Figures 2 and 3, inclusive, 24 indicates the steering shaft of the vehicle to which is secured a collar 25 having opposed arcuate projections 26 which operate as resetting cams for the switch mechanism. Collar 25 may be rigidly secured to steering shaft 24 or, if desired, may be yieldingly connected to the shaft as shown in Figure 3. Here the shaft is illustrated as equipped with spaced collars 120 and 122 and an annular wavy spring 124 is provided between collar 25 and collar 122 yieldingly urging the collar 25 upwardly into frictional engagement with collar 120. The advantage of the frictional engagement, a feature which is described and claimed in the prior application of Harry C. Doane, S. N. 308,033, is that any failure or jamming of the direction signal switch will not interfere with steering the vehicle.

Within the enlarged portion 20 of the steering shaft housing is a stamping 28 secured at one end to bracket 30 formed on the housing and at the other end to post 32 likewise secured to the housing. Beneath the stamping 28 is secured housing 34 enclosing the movable switch member 36 carrying conducting segment S. Switch member 36 is provided with an upstanding lug 38 extending through elongated slot 40 in stamping 28. Lug 38 may be provided with a metal sleeve or ferrule as shown to facilitate sliding of the lug and, if desired, the ferrule may be a lose fit on the lug. The bottom of housing 34 is closed by plate 42 made of insulation and carrying the fixed battery contact B', right turn contact R and left turn contact L.

The switch operating handle 18 is pivoted on a suitable pivot fixed to the stamping 28. Formed integral with handle 18 are extensions 46 and 48. Extension 46 carries an upstanding post 50 on which is mounted roller 52 engaging detent spring 54 mounted on lug 56 bent upwardly from stamping 28. Pivotally mounted in the end 64 of arm 48 is shaft 66 to the upper end of which is secured arm 62 connected by coil spring 60 with post 50. The spring 60 tends to rotate shaft 66 in counterclockwise direction. Secured to the other end of shaft 66 is arm 68 having a cutaway portion 70 providing in effect two opposed hooks or shoulders 71 and 73 adapted to engage the ends of cams 26 as hereinafter described.

Arm 43 is provided with a slot 72 adapted to engage over post 38 of the movable switch member.

The mechanism shown in Figures 2 and 3 operates as follows: The switch handle 18 is shown in off position in Figure 2 with the roller 52 engaged in the central annular seat in leaf spring 54. Detent 68 is held out of contact with collar 25 by engagement of its lug 80 with post 82, preferably roller equipped, secured to the underside of stamping 28.

A right turn signal may be given by turning handle 18 to the position shown in dotted lines in Figure 2. The handle is held in this position by engagement of roller 52 with the lower seat in spring detent 54. In turning the handle 18 lug 80 on detent 68 is moved out from the beneath stud 82 permitting coil spring 60 to swing detent 68 to dotted line position in engagement with collar 25. The movement of handle 18 has also, through engagement with post 38, caused conducting segment S to bridge contacts R and B' thus supplying interrupted current to the right hand direction signals.

As the steering wheel is now turned toward the right the reset cams 26 simply swing the detent 68 on pivot 69 without causing movement of lever 18. When the turn has been completed and the steering wheel is returned to straight ahead position the leading edge of one of the cams 26 engages shoulder 71 of detent 68, thereby moving the detent toward the right as shown in Figure 2 and with it the switch handle 18. As the roller 52 moves over the hump between the lower seat in detent spring 54 and the central arcuate seat, movement of the lever 18 is accelerated and at the same time hump 80 on detent 68 is engaged by stud 82 causing the detent 68 to move out of engagement with the reset cam. The parts are thus automatically returned to off position shown in Figure 2 and with them of course the movable switch contact S is returned to the off position shown in Figure 3.

In the case of a left turn, handle 18 is moved in counterclockwise direction bringing the cam 68 to the position indicated in Figure 4 in which the shoulder 73 on the detent engages collar 25 as shown in that figure. Resetting is accomplished in substantially the same manner as previously described and no separate description is believed necessary.

The modification shown in Figures 4 and 5 consists chiefly in the substitution of torsion spring 130 for coil spring 60. The torsion spring is secured at one end to stud 132 fixed to arm 48' and at the other end in one of the notches 134 formed in disc 136 secured to shaft 66' to the lower end of which is secured detent 68. Another slight modification consists of the provision of an elliptical socket or depression 140 in arm 48' in place of the slot 72. The operation of this form of the device is the same as that previously described.

Various other modifications will occur to those skilled in the art.

We claim:

1. In operating means for direction signals the combination of a rotatable steering shaft, a lever pivoted alongside the shaft having direction indicating positions and an intermediate off position, means operated by the lever for giving a signal when the lever is in either direction indicating position, a detent having oppositely facing engaging portions pivoted to said lever, means on said shaft adapted to have ratchet engagement with one or the other of said engaging portions when said lever is moved to direction indicating position and the shaft is rotated to make the turn and to engage said engaging portion to restore the detent and lever to off position when the direction of rotation of the shaft is reversed.

2. In operating means for direction signals the combination of a rotatable steering shaft, a lever pivoted alongside the shaft having direction indicating positions and an intermediate off position, means operated by the lever for giving a signal when the lever is in either direction indicating position, a detent pivoted to the lever provided with oppositely facing engaging portions, means on said shaft adapted to have ratchet engagement with one or the other of said engaging portions when said lever is moved to direction indicating position and the shaft is rotated to make the turn and to engage said engaging portion and restore the detent and lever to off position when the direction of rotation of the shaft is reversed, means yieldingly urging the detent toward the shaft, and means operative when the lever is in off position for holding the detent out of engagement with the shaft.

3. In operating means for direction signals the combination of a rotatable steering shaft, a lever pivoted alongside the shaft having direction indicating positions and an intermediate off position, means operated by the lever for giving a signal when the lever is in either direction indicating position, a detent pivoted at one end to the lever and provided adjacent the other end with oppositely facing shoulders, means associated with said shaft adapted to have ratchet engagement with one or the other of said shoulders when said lever is moved to direction indicating position and the shaft is rotated to make the turn and to engage said shoulder and restore the detent and lever to off position when the direction of rotation of the shaft is reversed, means yieldingly urging the detent toward the shaft, and means operative when the lever is moved to off position for swinging said detent out of engagement with the shaft.

4. In operating means for direction signals the combination of a rotatable steering shaft, an operating member movably mounted adjacent the shaft having direction indicating positions and an intermediate off position, means operated by the member for giving a signal when the member is in either direction indicating position, a detent pivoted at one end to the member and provided adjacent the other end with oppositely facing engaging portions, means associated with said shaft adapted to have ratchet engagement with one or the other of said engaging portions when said lever is moved to direction indicating position and the shaft is rotated to make the turn and to engage said engaging portion and restore the detent and lever to off position when the direction of rotation of the shaft is reversed, means yieldingly urging the detent toward the shaft, and means operative when the operating member is moved to off position for swinging said detent out of engagement with the shaft.

5. In operating mechanism for direction signals the combination of a rotatable steering shaft, a lever pivoted adjacent the shaft having divergent arms, yielding means cooperating with one of said arms to hold said lever in either direction indicating position or in intermediate off position, a switch having corresponding circuit closing positions and an intermediate off position, means for operating the switch from one of said arms, a detent pivoted to one of said arms and having oppositely facing engaging portions, a steering shaft, means associated with said shaft adapted to have ratchet engagement with one or the other of said engaging portions when said lever is moved to direction indicating position and the shaft is rotated to make the turn and to engage said engaging portion and restore the detent and lever to off position when the direction of rotation of the shaft is reversed, and means yieldingly urging the detent toward the shaft.

OWEN M. NACKER.
ANDREW L. VARGHA.